Nov. 2, 1937.  A. M. FERRARI ET AL  2,097,659
SAW SWAGE
Filed Jan. 15, 1936  3 Sheets-Sheet 1
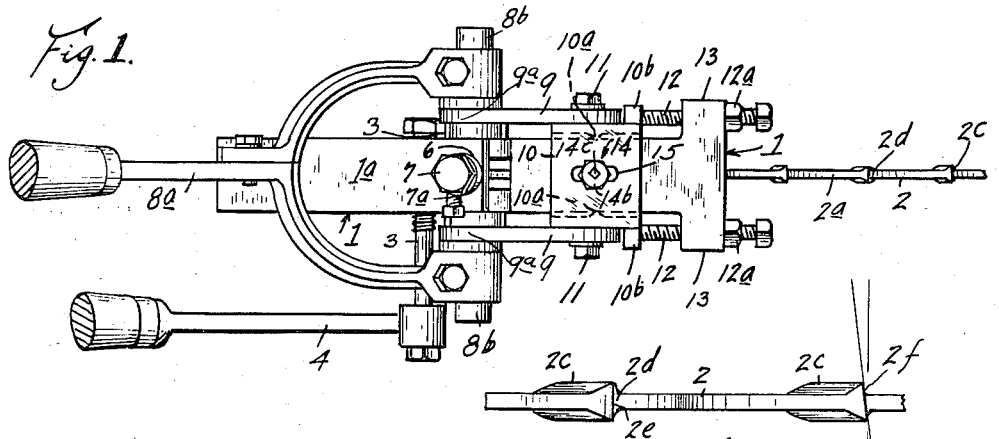
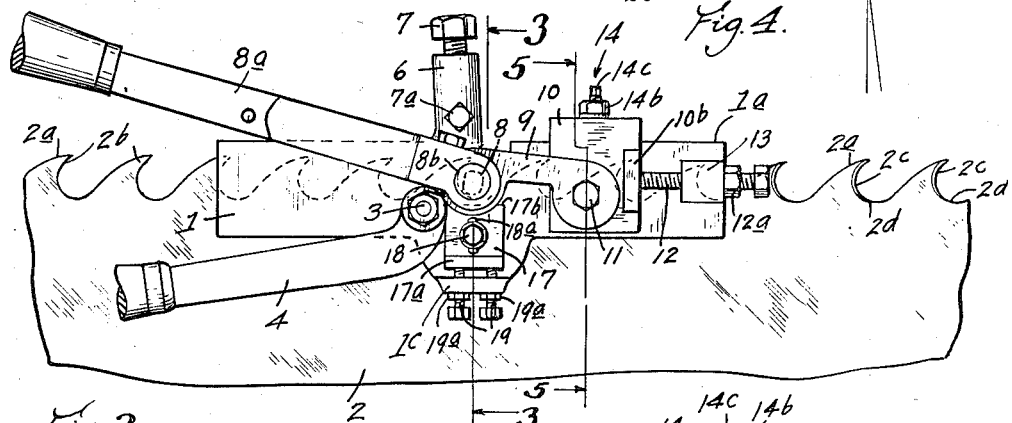
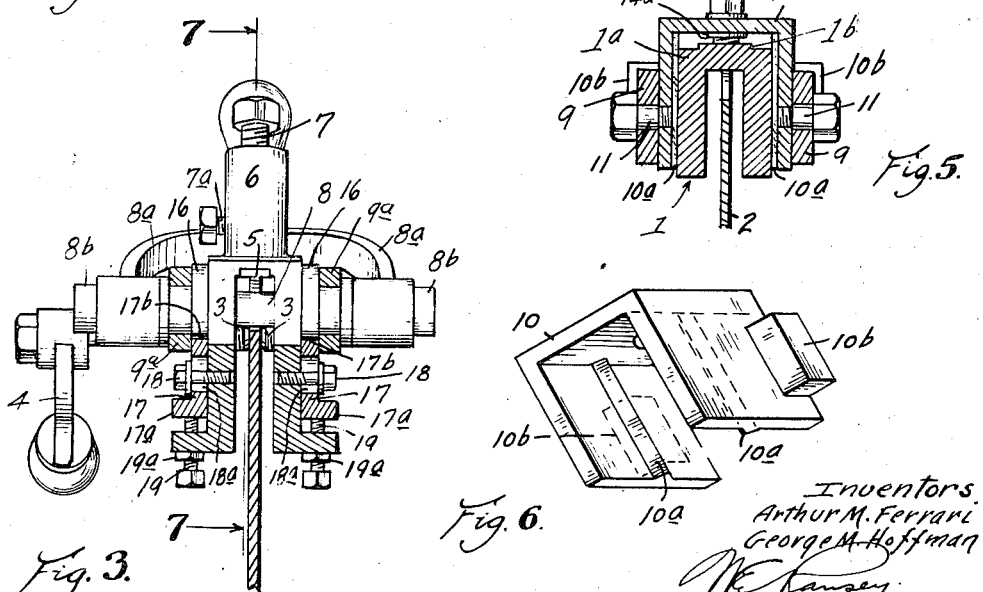
Inventors
Arthur M. Ferrari
George M. Hoffman
by W. Ramsey
Attorney.

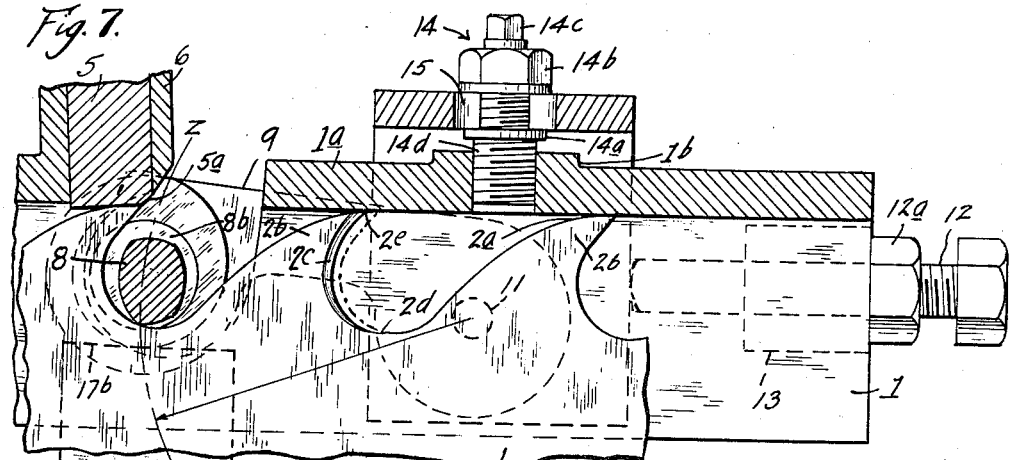

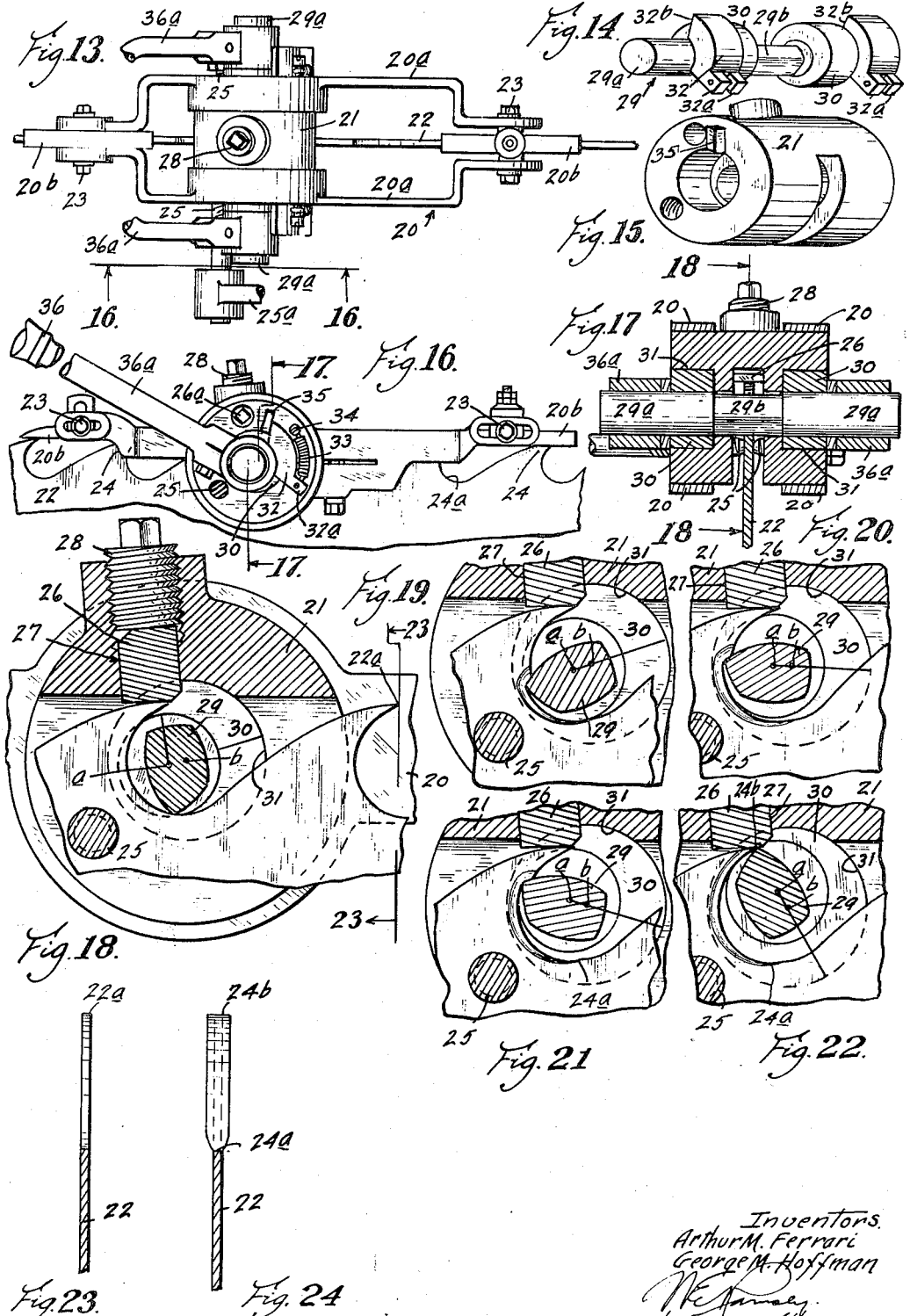

Patented Nov. 2, 1937

2,097,659

UNITED STATES PATENT OFFICE 2,097,659

SAW SWAGE

Arthur M. Ferrari and George M. Hoffman, Algoma, Oreg.

Application January 15, 1936, Serial No. 59,268

8 Claims. (Cl. 76—54)

The object of our invention is to provide a new swage capable of swaging the entire throat or gullet of a saw tooth in one continuous movement of the swaging die and to provide a swaging stroke which has predetermined curved contour.

A further and more specific object of our invention is to provide a swage which is capable of forming the various forms of saw teeth illustrated in our co-pending application for patent entitled "Method and means for saw surfacing and cleaning a saw kerf" which application is Serial No. 57,482. Our swage is adapted to form said teeth quickly and with no greater effort than is necessary to form a standard saw tooth having only a swaged point.

A further object of our invention is to provide a swage capable of adjustment to such a degree that the swaging action can be adjusted to produce several different strokes of varying formation. This object is accomplished by providing the normal eccentric die with a swinging movement as well as a rotary movement so that by various combinations of rotation and swinging similar varying swaging strokes can be produced and similar swaging patterns can be effected with a single swaging die.

A further object of our invention is to provide a swage in which the axis of rotation of the swaging die can be adjusted angularly to incline the face of the swaged tooth accordingly. This is particularly valuable to correct teeth which have been swaged so that their cutting faces are not normal to the saw faces. Our swage thus permits an adjustment to be made which causes the points of the teeth, as well as the remainder of the cutting edge of the saw teeth to be squared up to produce a proper action in the saw teeth.

These objects are accomplished in a swage having the usual head, handle, saw gripping screws, an eccentric die rotatably mounted in the head and an operating handle for said die. Said swage is provided with a mounting on which swing arms are journalled, susceptible of swinging movement about an arc, the center of which is not coincident with the eccentric axis or the concentric axis of the die. The center of the swinging arc is laterally spaced from said axes to such a degree that the swinging movement of said die upon said arc combines with the eccentric movement about the eccentric axis of said die to provide a compound movement which will produce a non-circular swaging swath for said die.

The details of our invention and the mode of operation thereof are hereinafter described with reference to the accompanying drawings in which:

Fig. 1 is a plan view of a swage embodying our invention and shown mounted upon a saw blade, portions of the operating handles being shown broken away;

Fig. 2 is an elevation thereof mounted on said blade;

Fig. 3 is a section taken on the lines 3—3 in Fig. 2 thru the head of the swage and adjacent the eccentric swaging die;

Fig. 4 is a larger scaled, more or less diagrammatic plan view, showing the relative angle of a tooth extending obliquely to the faces of the saw blade, which swaging angle is not to be desired and which our swage is adapted to correct;

Fig. 5 is a section taken on the line 5—5 in Fig. 2 thru the mounting upon which arms are pivotally secured for giving the swaging die an arcuate swinging movement;

Fig. 6 is a detail in perspective of said mounting;

Fig. 7 is a larger scaled fragmentary view taken substantially along the line 7—7 in Fig. 3 thru the rotatable eccentric swaging die and the mounting carrying the pivotal connections for swinging the axis of rotation of the rotatable die about an arc, said arc being diagrammatically illustrated;

Figs. 8, 9, 10 and 11 are larger scaled diagrammatic views illustrating the manner in which the eccentric die is given a compound movement rotating about its eccentric axis and swinging about a laterally spaced axis, said figures show the progressive action of said die in producing the swaging swath, the figures reproducing the position of the parts in swaging a saw tooth when the eccentric axis moves from lines $x1$ to $x3$, inclusive, in Figures 8 to 11, respectively;

Fig. 12 is a view looking into the gullet of a tooth formed by a swaged embodying our invention;

Fig. 13 is a fragmentary plan view of a modified type of swage embodying our invention;

Fig. 14 is a perspective view of the eccentric swaging die and the associated cam elements in said modification;

Fig. 15 is a perspective view of the hub of said swage in which said die is journalled;

Fig. 16 is an elevation of said modified swage taken on the line 16—16 in Fig. 13;

Fig. 17 is a vertical section taken on the line 17—17 in Fig. 16;

Fig. 18 is a fragmentary section of said die, the anvil and the tooth, said section being taken on the line 18—18 in Fig. 17 and being shown on a substantially larger scale;

Figs. 19, 20, 21 and 22 are sectional diagrammatic views illustrating the manner in which the swaging action progresses in said modification;

Fig. 23 is a diagrammatic view looking into the gullet of an unswaged tooth, the section being taken on the line 23—23 in Fig. 18; and Fig. 24 is a section similar to Fig. 23 illustrating the degree of swage produced by a device embodying our invention.

Our invention is adapted to be used with any type of saw swage having an eccentrically mounted rotatable swaging die. Two different types of swages embodying our invention are illustrated and described herein.

In the modification shown in Figs. 1 to 12, inclusive, the frame 1 is formed of inverted U-shaped section and overlies the toothed-edge 2a of the saw blade 2. A pair of opposed screw clamps 3, one of which is operable by the handle 4 fixes the frame against movement upon said saw blade. The frame is set on the saw teeth in the usual manner so that the anvil 5 overlies a saw tooth 2b so that the tapered edge 5a of the anvil forms substantially a continuation of the hooked gullet of the tooth. The anvil is seated in the holder b and is moved to proper position longitudinally thereof by a set screw 7. A holding set screw 7a fixes the anvil in adjusted position. A rotatable eccentric swaging die 8 lies transversely of the frame and is journalled in bearings 9a, carried by the free end of the swing arms 9.

A mounting 10 also of inverted U-shaped section overlies the frame and bears thereon. Said mounting is provided with a pair of opposed triangular-sectioned elements 10a which bear against the side walls of the frame. These are illustrated in Fig. 6 and function to prevent the mounting 10 from moving laterally upon the frame. Said mounting is permitted angular movement, however, about a vertical axis extending thru the center thereof to adjust the axis of rotation of the eccentric die so that it may be arranged obliquely to the longitudinal center line of said frame.

A pair of pivot studs 11 extend thru the walls of the mounting 10 and are seated in the side walls of the frame 1. Said pivot studs form the pivotal connection for the swing arms 9 and the center of the swinging arc extends thru the axial centers of said studs. Said center of the swinging arc is diagrammatically identified as $y$ in Figs. 7 to 11, inclusive.

The mounting 10 is given longitudinal movement on the frame by two longitudinally extending adjusting screws 12 which abut against the back of the mountings, as is illustrated in Figs. 1 and 2. These adjusting screws tend to shove the mountings towards the left as they are threaded further into the tapped ears 13 formed upon the right hand end of the frame, as shown in Figs. 1 and 2. Said screws are each provided with a lock nut 12a for holding them in set position. The ends of said adjusting screws abut against offset lugs 10b extending laterally from the sides of the mounting as is shown in Fig. 1.

The mounting 10 is shifted vertically upon the frame 1 by a stud 14 tapped into the upper portion 1a of the frame thru a boss 1b formed thereon, as is illustrated in Fig. 7. A shoulder 14a is formed upon said stud which bears against the under surface of the mounting 10 and a nut 14b is carried by the threaded portion of said stud and bears against the upper portion of said mounting. The nut and shoulder grip the mounting between them and hold the mounting against movement longitudinally of the frame. It is to be remembered that the adjusting screws 12 merely abut against the back of the mounting and tend to move it towards the left, as viewed in Figs. 1 and 2, but do not tend to prevent said mounting from moving out of abutment with the ends of said screws. The latter is prevented by the gripping action between the nut 14b and the shoulder formed upon the stud 14. Said stud passes thru an elongated slot 15 formed in the mounting 10 and thus movement of said mounting is accommodated by the elongation of said slot.

Two longitudinally arranged adjusting screws 12 are provided, one on each side of the center line of the mounting and the frame so that the mounting can be adjusted angularly about a vertical axis extending thru the center of the stud 14. The stud 14 is in lateral alinement with the triangular internal ridges 10a and thus if one screw 12 is screw threaded further into the lugs 10b of said mounting than the other, and the other stud correspondingly backed off, angular movement of the mounting 10 is accomplished about said vertical axis.

The arms 9 are swung about the arc z—z diagrammatically illustrated in Figures 7 to 11, inclusive, by a pair of cams 16 formed integrally with the swaging die 8. These are illustrated in Figs. 3 and 7 to 11, inclusive.

The axial center of the cams, as illustrated in Figures 8 to 11, inclusive, lies at the point $y'$. The axis of rotation of the die itself lies on the point indicated as a small circle in said figures. The cams 16 ride upon plane surfaced guides 17 fastened to the frame sides by studs 18. Said guides can move vertically upon the frame as the studs 18 pass thru elongated slots 18a in the sides of the guides, as is illustrated in Fig. 3. The movement vertically of the guides is controlled by set screws 19, one set screw being provided for each guide. Said set screws are provided with lock nuts 19a for holding them in set position. Said set screws are tapped into laterally extending flanges 1c in the frame 1 and abut against flanges 17a formed upon the lower edges of the guides 17.

As is common with swages provided with eccentric swaging dies, the swaging die is rotated by its handle 8a which is preferably bifurcated and engages both ends of the die, as is illustrated in Fig. 1. The die is rotated about an axis, the die being journalled in bearings 9a in the free ends of the swinging arms 9. As long as the eccentric portions of the cams 16 do not ride upon or engage the guide surfaces 17b of the guides 17, the die rotates about its axis illustrated by a small circle, said axis at the start lies upon the intersection of the line $x$ with the arcuate line z—z.

In Fig. 7 the concentric portions of the cam 16 bear upon the guide surface of 17b. The eccentric portions of the cams are thus not in engagement with the surfaces and the die is free to rotate about its normal axis at $o$. It is to be understood that the swaging die 8 has concentric ends 8b and it is only the central portion which is of non-circular section, as illustrated in section in Figs. 7 to 11, inclusive. When the die 8 is rotated to such a degree that the eccentric portions of the cams 16 come in contact with the guide surfaces 17b, the axis of the die is shifted along the arcuate path z—z.

In Fig. 8 the cams have been turned until the eccentric portions of the cam have just come into abutment with the guide surface 17b but have not lifted the axis of rotation from its normal position. In Fig. 9 the cams have lifted the axis of rotation from x to x' while the die has moved thru approximately 17 degrees of rotation. In Fig. 10 the die has moved along the line z—z a distance from x to x2 and the die has been rotated approximately 18 degrees of rotation further 45 degrees of rotation.

Thus, as the parts are illustrated in the accompanying drawings, during the first 78 degrees of rotation the swaging action is about the axis of rotation of the die. During the other 97 degrees of rotation the axis progressively moves along the path z—z from the point where the line x intersects said path to a point where the line x3 intersects said path. This progressive movement is illustrated by the positions the die assumes as it is progressively changed in Figs. 7, 8, 9, 10 and 11, respectively. In Fig. 11 the swaging swath is wholly made and the completed swage is formed along the entire length of the gullet of the saw tooth. The completed swage is illustrated in Fig. 12, the saw tooth being swaged at 2c from its root 2d to its point 2e.

Of course, the relative proportion of swinging action to rotation of the die can be varied by adjusting the guides 17 vertically upon the studs 18 by means of the set screws 19. The center y of the swinging arcs can be moved vertically by adjusting the stud 14 in its tapped aperture in the boss 1b in the frame. This is accomplished by turning the squared end 14c of said stud and rotating said stud so that the threaded portion 14d thereof climbs upon its threaded connection. The center of the swing arc y can be shifted horizontally, that is, longitudinally of the saw, by similarly rotating the adjusting screws 12. The axis of the swing, which would extend thru the center y can be adjusted angularly by setting said adjusting screws 12 differently, thus drawing in one side of said axis and relatively pushing out the other end of the axis.

The latter action is desirable if the bearings for the swaging die become out of alinement to produce teeth illustrated as 2f in Fig. 4. Said teeth have their points or, in fact, their entire cutting faces extending upon lines inclined obliquely to the faces of the saw blade. This provides imperfect cutting and to correct such condition, it is frequently desirable to swage said teeth at an equal but opposite angle. This can be accomplished by the relative adjustments of the screws 12, previously described, to produce a tooth which has its cutting face extending at right angles or normal to the saw faces.

Another modification of our invention, which we have shown in Figs. 13 to 22, inclusive, shows a slightly different type of saw swage embodying our invention. In said type of swage the type of frame 20 is U-shaped in section at its ends but the center portion comprises two spaced off-set arms 20a carrying a central capped hub 21 between them. The ends 20b of said frame fit over and ride upon the toothed edge 22a of a saw blade 22. Adjustable devices 23 are normally carried by said ends to level up the frame with the blade carrying the teeth 24 to be swaged. This modification also has a pair of gripping screws 25, one of which is operated by a handle 25a to hold the swage against movement upon the saw blade. An anvil 26 is movably mounted in a radially extending bore 27 in the hub. Movement of said anvil longitudinally of said bore is controlled by a threaded set screw 28. The anvil is held in set position by a set screw 26a in the common manner.

An eccentric swaging die is journaled transversely of the hub 21. The ends of said swaging die are of circular section and the middle portion is non-circular in section. A section thru the non-circular portion is shown in Figs. 19 to 22, inclusive, and said non-circular central portion constitutes the actual swaging element operating upon the saw teeth 24. Two spaced cams 30 are arranged to encircle and provide bearing for the cylindrical ends 29a of the swaging die. The cams are housed in bores 31 formed in the hub 21, said bores retaining the cams constitute bearings for the latter.

The axial centers of the bores, of course, are offset from the axis of rotation of the swaging die. In Figs. 19 to 21, inclusive, the axis of rotation of the die is designated by reference character a while the axis of rotation of the cam is indicated by reference character b. Said cams are provided with outstanding lugs 32 having ears 32a extending laterally from the backs thereof. Each lug is provided with a pair of laterally extending ears 32a spaced a slight distance apart. Each lug is secured to one end of a coiled spring 32, the other end of each of the springs is anchored by a screw 34 to the hub of the swage. Said springs normally return the lugs and therewith the cam to a point where said lugs each abut against a protuberance 35. The portions 36a of bifurcated handle which rotates the die are adapted to engage the faces 32b of the lugs simultaneously so that the cams at each side of the non-circular central portions will be rotated uniformly. The rotation of said lugs and therewith the cam is against the action of the springs 33 and when the handle is returned to its original position, the cams and their associated lugs are returned against the protuberances 35 by the action of the springs 33.

As in the previous modification, the swaging die is permitted to have independent movement under the action of the handle 36 for a part of its movement. That is, the die alone moves from the position it assumes in Fig. 18 to the position it assumes in Fig. 19. At this point, the offset portions 36a of the handle 36 come into abutment with the faces 32b of the lugs 32. The engagement of these parts causes the continued movement of the handle 36, in a counter-clockwise direction as is viewed in Fig. 16, to cause the cam to be moved along with the swaging die 29. This causes the point of the swaging element which engages the gullet of the saw tooth 26, to take a non-circular path at the end of the swaging action. When the die rotates from the position assumed in Fig. 18 to the position it assumes in Fig. 19, it moves along a truly circular path about the axis a. Thereafter the movement is produced by the rotation about said axis a and the progressive rotation of the cams about their axis b. The point thus moves from a circular path to one which is non-circular about either of these two axes.

The relative angularity of the two axes is illustrated by the line extending thru the points a and b in Figs. 19 to 22, inclusive. The change in their relative position is progressively illustrated by the change in angularity as said die and said cams rotate about, under the influence of the handle 36.

The swath produced by the die in swaging the saw tooth is correspondingly illustrated. The tooth shown in Fig. 23 is entirely unswaged while the tooth shown in Fig. 24 is completely swaged. The tooth 24 is swaged, as in the previous modification, from its root 24a to its point 24b; that is, the entire gullet of the tooth is swaged.

We claim:

1. In a saw swage provided with a head, a die mounted for rotatable movement therein and an anvil arranged in operative relation therewith, a handle for rotating said die and means for securing said head to a saw blade, said die having a swaging portion arranged eccentrically to the axis of rotation of said die and devices for moving said die while rotating in said head along a curved path non-coincident with the path described by the swaging portion of the die.

2. In a saw swage provided with a head, a die mounted for rotatable movement therein and an anvil arranged in operative relation therewith, a handle for rotating said die and means for securing said head to a saw blade, said die having a swaging portion arranged eccentrically to the axis of rotation of said die and devices arranged to rotate about an axis spaced from the axis of rotation of the die for moving said die while rotating in said head along a curved path non-coincident with the path described by the swaging portion of the die.

3. In a saw swage provided with a head, a die mounted for rotatable movement therein and an anvil arranged in operative relation therewith, a handle for rotating said die and means for securing said head to a saw blade, said die having a swaging portion arranged eccentrically to the axis of rotation of said die and devices for moving said die while rotating in said head along a curved path non-coincident with the path described by the swaging portion of the die, but following generally in the same direction as the latter.

4. In a saw swage provided with a head, a die mounted for rotatable movement therein and an anvil arranged in operative relation therewith, a handle for rotating said die and means for securing said head to a saw blade, said die having a swaging portion arranged eccentrically to the axis of rotation of said die, devices arranged to rotate about an axis spaced from the axis of rotation of the swaging portion of the die for moving said die simultaneously along a path non-coincident with the path described by the swaging portion of the die and adjustable means for varying the devices to change the relative arrangement of the axis of rotation with the axis of swing, respectively, of the die.

5. In a saw swage provided with a head, a die mounted for rotatable movement therein and an anvil arranged in operative relation therewith, a handle for rotating said die and means for securing said head to a saw blade, said die having a swaging portion arranged eccentrically to the axis of rotation of said die, devices arranged to rotate about an axis spaced from the axis of rotation of the swaging portion of the die for moving said die simultaneously along a path non-coincident with the path described by the swaging portion of the die and adjustable means for varying the relative angularity of said two axes.

6. In a saw swage provided with a head, a rotatable die mounted therein and an anvil arranged in operative relation therewith, a handle for rotating said die and means for securing said head to a saw blade, said die having a swaging portion arranged eccentrically to the axis of rotation of said die, devices arranged to rotate about an axis spaced from the axis of rotation of the swaging portion of the die for moving said die along a path non-coincident with the path described by the swaging portion of the die, adjustable means for varying the devices to change the relative arrangement of the axis of rotation with the axis of swing, respectively, of the die and adjustable means for varying the relative angularity of said two axes.

7. In a saw swage provided with a head, a rotatable die mounted therein and an anvil arranged in operative relation therewith, a handle for rotating said die and means for securing said head to a saw blade, said die having a swaging portion arranged eccentrically to the axis of rotation of said die, devices arranged to rotate about an axis spaced from the axis of rotation of the die, but normally arranged parallel thereto, for moving said die along a path non-coincident with the path described by the swaging portion of the die and adjustable means for varying the relative angularity of said two axes.

8. In a saw swage provided with a head, a rotatable die mounted therein and an anvil arranged in operative relation therewith, a handle for rotating said die and means for securing said head to a saw blade, said head having a swaging portion arranged eccentrically to the axis of rotation of said die, devices including a cam element arranged to rotate about an axis spaced from the axis of rotation of the swaging portion of the die for moving said die along a curved path non-coincident with the path described by the swaging portion of the die but following generally in the same direction as the latter, the handle for said die being operatively connected to rotate said die and engage said devices so that they operate in predetermined sequence, thereby to cause the swaging portion of the die to follow a non-circular path, adjustable means for varying the devices to change the relative arrangement of the axis of rotation with the axis of swing, respectively, of the die and adjustable means for varying the relative angularity of said two axes.

ARTHUR M. FERRARI.
GEORGE M. HOFFMAN.